United States Patent [19]

Robinson

[11] 4,086,445

[45] Apr. 25, 1978

[54] TELEPHONE HANDSET TRANSMITTER WITH IMPROVED OUTPUT RESPONSE

[75] Inventor: Ronald Charles Robinson, London, Canada

[73] Assignee: Northern Telecom Limited, Montreal, Canada

[21] Appl. No.: 761,275

[22] Filed: Jan. 21, 1977

[51] Int. Cl.² .............................................. H04R 1/28
[52] U.S. Cl. ............................. 179/121 R; 179/180
[58] Field of Search ................... 179/121 R, 122, 123, 179/124, 125, 126, 127, 128, 129, 130, 138, 180; 181/158, 160, 166

[56] References Cited

U.S. PATENT DOCUMENTS

| 2,540,498 | 2/1951 | Tallman | 179/180 |
| 3,246,721 | 4/1966 | Martin | 179/180 |

FOREIGN PATENT DOCUMENTS

| 227,805 | 10/1961 | Austria | 179/121 R |
| 2,246,981 | 4/1974 | Germany | 179/180 |
| 2,052,444 | 11/1971 | Germany | 179/180 |

Primary Examiner—George G. Stellar
Attorney, Agent, or Firm—Sidney T. Jelly

[57] ABSTRACT

A conventional telephone handset transmitter is given a modified (improved) output response by providing an acoustic resistance path to and from the confined air chamber formed between the frame and the diaphragm of the transmitter, the acoustic resistance being less than conventional, for example less than 40 ohms a maximum and approaching zero as a minimum. More than one aperture can be provided, and a tube may surround an aperture to provide some inertance to air flow.

4 Claims, 7 Drawing Figures

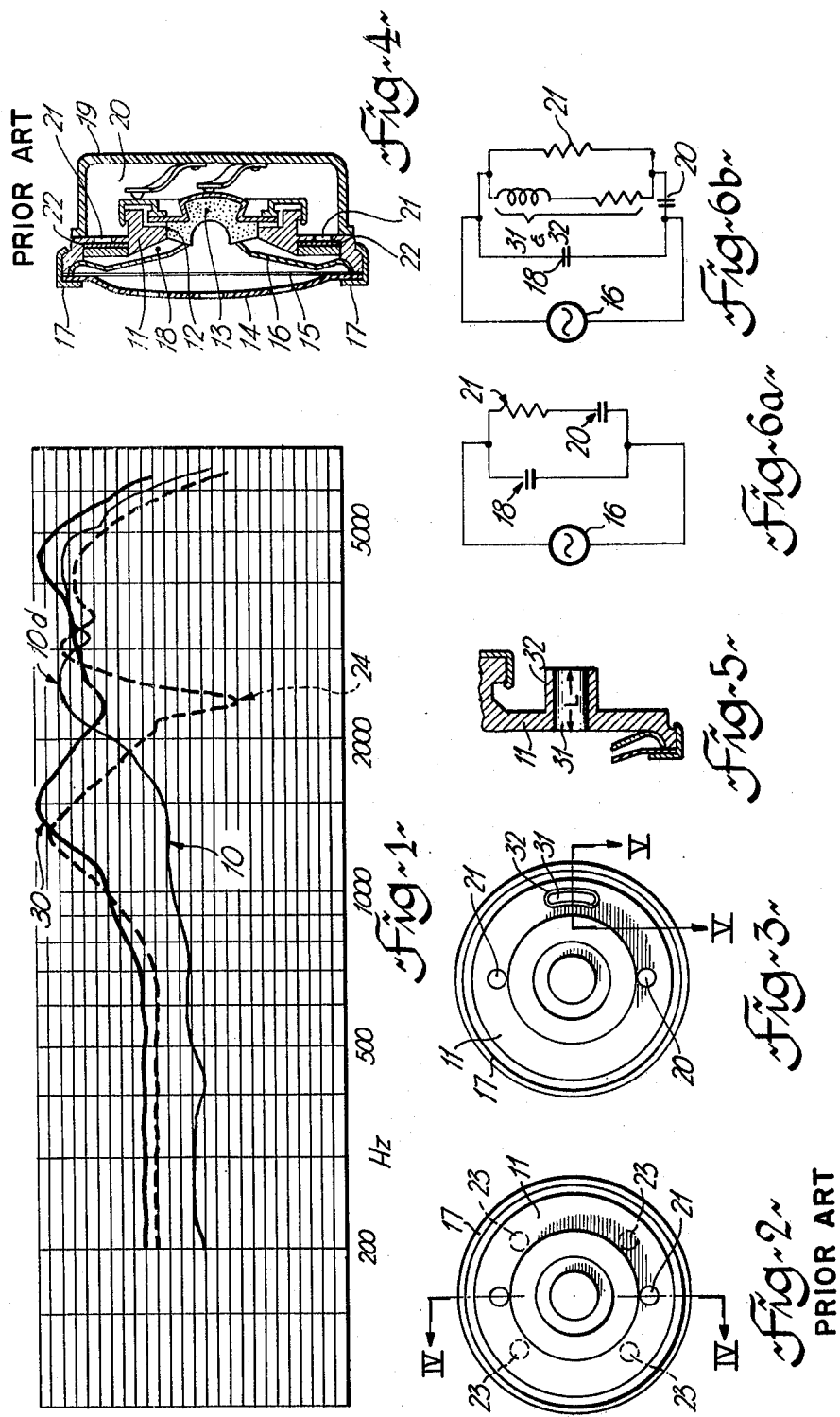

TELEPHONE HANDSET TRANSMITTER WITH IMPROVED OUTPUT RESPONSE

The present invention is concerned with a telephone handset transmitter with an improved output response.

Conventional telephone transmitters, as used in telephone sets in North America for example, have an output curve which increases from about 200 Hertz with a peak at the region of 2000 to 4000 Hertz. To provide a more universally acceptable transmitter it is desirable to broaden this peak by shifting it toward the lower end of the output frequency band.

This desirable objective can be obtained by a redesign of the transmitter, the main change being to make it larger in diameter so as to have a diaphragm that will vibrate at a lower resonating frequency. However it would not then fit into the present handset handle, which then would also need to be redesigned. There would thus be quite considerable expense in redesigning new mold tools for the handset, and new tools for the transmitter.

The present invention is concerned with the modification of the present transmitter so that the response peak is widened with a shifting of the widened peak toward the lower frequencies.

The invention will be readily understood by the following description of certain embodiments, by way of example, in conjunction with the accompanying drawings, in which:

FIG. 1 is three curves, one curve illustrative of the response of conventional transmitters, another curve illustrative of the response of a modified transmitter and a further curve illustrative of an undesirable feature in a response;

FIG. 2 is a plan view of the back side of a transmitter unit of conventional form;

FIG. 3 is a plan view of the back side of a modified transmitter unit of the form as in FIG. 2;

FIG. 4 is a cross-section on the line IV—IV of FIG. 2;

FIG. 5 is a cross-section on the line V—V of FIG. 3, to an enlarged scale;

FIGS. 6a and 6b are simplified electrical circuits representative of the acoustic systems of the transmitter units of FIGS. 2 and 3 respectively.

A conventional transmitter as illustrated in FIG. 2 has a response curve of the form of the curve 10 in FIG. 1 when tested in the British Modal Speaking Position (BMSP). As will be seen there is a peak 10a between approximately 2000 and 4,500 Hertz.

Considering FIGS. 2 and 4, a conventional transmitter comprises a frame or bridge 11, usually a metal die casting, and having a central aperture 12 in which is mounted the carbon chamber 13. A perforated grid 14 extends over the front of the frame or bridge, with a membrane 15 behind the grid. A diaphragm 16 also extends across the front of the frame. The diaphragm 16, membrane 15 and perforated grid 14 are held onto the frame at the periphery by a metal rim 17. A confined air chamber 18 is formed between the diaphragm 16 and the frame 11.

The conventional transmitter is positioned on a cupped part in the handset, indicated at 19 in FIG. 4. A confined air chamber 20 is formed, bonded by the transmitter and the walls of the cupped part. The chamber 20 is connected to the chamber 18 via apertures 21 in the frame 11, the aperture containing a material 22 having a predetermined resistance to air flow. This material is generally referred to as acoustic resistance although the terminology "acoustic impedance" is understood to be more correct. The acoustic resistance of each aperture 21 with the materal 22 is of the order of 110 to 220 acoustic ohms. Thus for two apertures the resistance is of the order of 55 to 110 acoustic ohms, with 55 ohms being of the order of minimal acoustic resistance for conventional transmitters. The number of apertures can vary, two being common, but three being used also to achieve the 55 to 110 ohms acoustic resistance design range of conventional transmitters. The resultant acoustic resistance affects the form of the peak 10d in the response curve of conventional carbon transmitters. For example the peak may have a higher level with higher acoustic resistance. With the acoustic resistors removed from the apertures of a conventional carbon transmitter there is a serious distortion as indicated by the dotted line 24 in FIG. 1.

Altering the stiffness of the diaphragm 16, did not produce any useful change in the form of the curve 10. It became evident that any changes in the physical parameters would have to be major to achieve the frequency response change, resulting therefore in significant tooling costs.

The present invention results from the feature of modifying the acoustic parameters of the transmitter. In general terms the transmitter acoustic resistance is reduced to a very low value.

Additionally for further improvement a volume of air is made to connect the existing air chambers 18 and 20. The inertance of this connecting volume of air is made to be within preferred limits while its acoustic resistance is at a very low value.

The lowering of the acoustic resistance 21 magnitude as well as additionally connecting the two air chambers 18 and 20 with a volume of air having an inertance within preferred limits provides a widening and flattening of the frequency response peak, for example, as illustrated by curve 30 in FIG. 1. There is also increased response at lower frequencies.

The provision of a low-resistance inertance between the air chambers 18 and 20 can be achieved by an opening formed in the frame, or by an opening with a tube extending from it. As illustrated in FIGS. 3 and 5, a slot 31 is formed in the frame 11, with a tube 32 extending conveniently from one side—the rear side. The plan form of the slot can vary; in the example illustrated it is rectangular. The slot gives an acoustic resistance of a very low value, for example, below 3.5 acoustic ohms. The existing acoustic resistors formed by apertures 21 and material 22 reduce the resistance slightly further. Surprisingly it has been observed that even though the approximately zero acoustic resistance of the large slot would appear to dominate the system, in fact the provision of the paralleling acoustic resistance path afforded by the acoustic resistance of apertures 21 and material 22 does modify the response curve shape. And this factor can be used to adjust the shape of the response curve by a suitable choice of a particular value-range of paralleling acoustic resistance.

For example consider a carbon transmitter with an added slot, or a slot-and-tube, with a "high-valued" acoustic resistance material 22 in apertures 21, of a value typical of conventional carbon transmitters. This "high" paralleling acoustic resistance could result in the appearance of a severe dip in the frequency response peaking region. As this acoustic resistance value is lowered below conventional minimum values, the antiresonance response dip in the peaked region of the response curve disappears. Additionally the response peak (which peaks at a lower frequency than conventional transmitters because of the slot or slot-and-tube embodiment) increases in magnitude. Lowering the paralleling acoustic resistance further to virtually zero acoustic ohms heightens this peak to its maximum. Therefore by designing the slot, or slot-and-tube, to a preferred optimum puts the response peak at a lower preferred frequency. Then by suitable choice of paralleling acoustic resistance somewhere in a range extending from less than that employed by conventional carbon transmitters down to approximately zero acoustic ohms, the height of the peak relative to the rest of the response can be set resulting therefore in some shaping of the response characteristic.

The serious distortion of the response of a conventional carbon transmitter indicated by dotted line 24 of FIG. 1 results if the conventional transmitter is operated with its acoustic material 22 removed from its apertures 21. Conventional transmitters are not made in this condition. However this condition can be looked upon as being a special case of a conventional transmitter modified to having a non-optimized slot or slots (the slot being the open circular apertures) and having a paralleling acoustic resistance of infinite value (that is, the paralleling acoustic resistance filled in). This results in the distorting dip in the peaking region similarly, though not as severely, as observed in a carbon transmitter having a slot or slot-and-tube and paralleling acoustic resistance equal to the acoustic resistance value of a conventional carbon transmitter.

The objective of this invention then is to provide a carbon transmitter with apertures 21 having acoustic resistors of much less a resistance value than present transmitter design calls for.

The objective of one embodiment of this invention is to reduce the overall bridge 11 acoustic resistance to something approaching zero ohms while at the same time increase the volume (i.e. increase the inertance) of air sitting between the chamber 18 and 20. Further an aperture or apertures containing acoustic resistance material is included in this bridge. This acoustic resistance paralleling the bridge slot opening is used to control the shape of the response characteristic. An extension of the concept is to add a tube to the slot to further increase the air volume (inertance of the air between the chambers 18 and 20).

Flattening and broadening the peak of the response curve, with some increase in output, is obtained by reducing the acoustic resistance between the two volumes 18 and 20, located in front of and behind the frame 11, either to some extent by additional apertures or by using acoustic material of lower resistance, or to a greater extent by adding a slot. Flattening and broadening the peak of the response curve and increasing its output is also obtained by positioning a tube around the slot, with a L/A ratio within preferred limits, $L$ being the length of the tube (axial length), as in FIG. 5, and $A$ being the area of the slot 31 on a plane normal to the axis of the tube 32. Higher (1000 Hertz) output levels, of the order of 4 dB and more have been obtained with the slot and the slot-and-tube as in FIGS. 3 and 5. For the slot-and-tube preferred limits for L/A are between about 1.5 and about 4.0.

The acoustic system can be represented by an electrical circuit. The systems of the transmitters of FIGS. 2 and 4 and FIGS. 3 and 5 are approximately represented in the circuits of FIGS. 6a and 6b respectively. The various features of the systems are indicated as their electrical equivalent. Thus the volumes 18 and 20 are represented as capacitances, the aperture 21 by a resistor, and the diaphragm 16 as a generator. In FIG. 6a, the resistance of the aperture 21 is in series with the capacitance of the volume 20 and the two are in parallel to the capacitance of the volume 18.

In FIG. 6b the resistances of the slot-and-tube 31 is shown in series with the inertance of the tube 32 and slot 31 while these two are in parallel with the resistance of the aperture 21. This parallel arrangement is in turn in series with the capacitance of the volume 20 and the whole is in parallel with the capacitance of the volume 18.

It should be appreciated that the particular parameters of acoustical resistance the size of the slot 31 and the L/A ratio of the tube are dependent upon the physical aspects of the transmitter acoustical system. For example FIG. 6b shows the electrical equivalent of the transmitter with the tube. Following with what has been described above, the inductance 32 in the simplified equivalent circuit represents the acoustical inertance of the air in the tube and slot; the capacitance 20 represents the volume of air in the cup behind the transmitter bridge; resistance 21 is the acoustical resistance of the paralleling acoustic resistors in the transmitter bridge. Since an acoustical system such as this can be represented by an electrical equivalent circuit it is possible then to establish a mathematical equation for the series resonant frequency of the electrical circuit using standard electric circuit theory. By substituting back in the acoustical equivalents for the electrical components the resonant frequency of the diaphragm, as contributed by the acoustical system, is derived mathematically and is in terms of the acoustical equivalents (i.e. the physical parameters such as the volume of the rear cup, the paralleling acoustical resistance in the bridge, the acoustical resistance of the tube and slot, the size of the tube conveniently in terms of the length-over-area (L/A), and so on).

Plotting this acoustical series resonance equation using frequency as the dependent variable, and using the paralleling bridge acoustic resistance as the independent variable, for different values of L/A, will give a family of curves from which the optimum design can be derived; that is the optimum values for tube length, tube cross-sectional area, rear cup volume and etc.

Intentional changes to these physical parameters can be acknowledged in the series resonant equation and similarly plotting new families of curves will give a prediction as to the effect on the series resonant frequency of the acoustical system. Since an objective is to decrease the acoustic series resonance to a much lower frequency the effectiveness of any physical changes such as chamber volume in achieving this can be derived from these families of curves.

The tube 32 has been shown as molded as part of the frame 11. This can be obtained by a relatively easy modification to existing tools. Alternatively the tube can be formed separately and attached to the bridge frame for example by bonding or mechanical fitting.

What is claimed is:

1. A telephone handset transmitter comprising:
   a frame;
   a diaphragm extending over one side of said frame and spaced therefrom, the periphery of said diaphragm connected to the periphery of the frame to define a first air chamber, between said diaphragm and said frame;

a cup-shaped member extending over the other side of the frame and having a peripheral portion extending towards the frame and connected to the periphery of the frame to define a second air chamber, between said cup-shaped member and said frame;

said diaphragm and said cup-shaped member forming an enclosure, said frame extending across said enclosure;

at least one aperture in said frame and interconnecting said first and second air chambers;

a perforated member extending over said at least one aperture;

a slot in said frame and interconnecting said first and second air chambers, said slot unobstructed at both ends, a tube surrounding said slot and extending from at least one side of said frame, said tube having a length/area ratio within predetermined limits, the length being the axial length of the tube plus slot thickness and the area being the area of the aperture in a plane normal to the axis of the tube;

the total acoustic resistance of said at least one aperture and said slot being less than about 20 ohms and more than zero.

2. A transmitter as claimed in claim 1, said slot having an acoustic resistance below 3.5 ohms.

3. A transmitter as claimed in claim 1, the length/area ratio between about 1.0 and about 4.0.

4. A transmitter as claimed in claim 1, including at least two apertures in said frame, said apertures covered with material having a predetermined resistance to air flow and having a combined acoustic resistance below about 20 ohms.

* * * * *